United States Patent [19]

Wallrafen

[11] Patent Number: 5,719,332
[45] Date of Patent: Feb. 17, 1998

[54] PROCESS AND SYSTEM FOR OPERATING A LEVEL SENSOR

[75] Inventor: Werner Wallrafen, Hofheim/Ts., Germany

[73] Assignee: VDO Adolf Schindling AG, Frankfurt, Germany

[21] Appl. No.: 452,256

[22] Filed: May 26, 1995

[30] Foreign Application Priority Data

Sep. 28, 1995 [DE] Germany ............... 44 34 559.3

[51] Int. Cl.$^6$ ............................................. G01F 23/22
[52] U.S. Cl. ........................... 73/295; 73/304 R; 340/622
[58] Field of Search .................... 73/295, 304 R; 374/54; 340/618, 620, 622

[56] References Cited

U.S. PATENT DOCUMENTS

| | | | |
|---|---|---|---|
| 3,111,031 | 11/1963 | Kuritza | 73/295 |
| 3,760,352 | 9/1973 | Marcoux | 73/295 |
| 3,955,416 | 5/1976 | Waiwood | 73/295 |
| 4,036,053 | 7/1977 | Jenkins | 73/295 |
| 4,116,045 | 9/1978 | Potter | 73/295 |
| 4,513,616 | 4/1985 | Bezard et al. | 73/295 |
| 4,564,834 | 1/1986 | Steele | 73/295 |
| 5,159,318 | 10/1992 | Kronberg | 73/295 |
| 5,174,153 | 12/1992 | Nakamo | 73/295 |
| 5,197,329 | 3/1993 | Grundy | 73/295 |

FOREIGN PATENT DOCUMENTS

| | | |
|---|---|---|
| 3148383 | 6/1983 | Germany . |
| 3333582 | 3/1984 | Germany . |
| 2127555 | 4/1984 | United Kingdom . |

*Primary Examiner*—William A. Cuchlinski, Jr.
*Assistant Examiner*—Andrew Hirshfeld
*Attorney, Agent, or Firm*—Martin A. Farber

[57] ABSTRACT

A process and a system for operating a level sensor, particularly for measuring amounts of liquid in motor vehicles, employs a plurality of heatable thermistors wherein a number of the thermistors are covered by liquid depending on the level of the liquid, and are cooled below a breakpoint temperature of the thermistors. The total resistance of the thermistors, which may be connected with further resistors, changes discontinuously as a function of the liquid level. At least one thermistor is located above the maximum possible level. The temperature of the thermistors is increased to such an extent by a feeding of electrical heating power that all thermistors which are above the existing level exceed their breakpoint temperatures, whereupon the total resistance is measured.

18 Claims, 7 Drawing Sheets

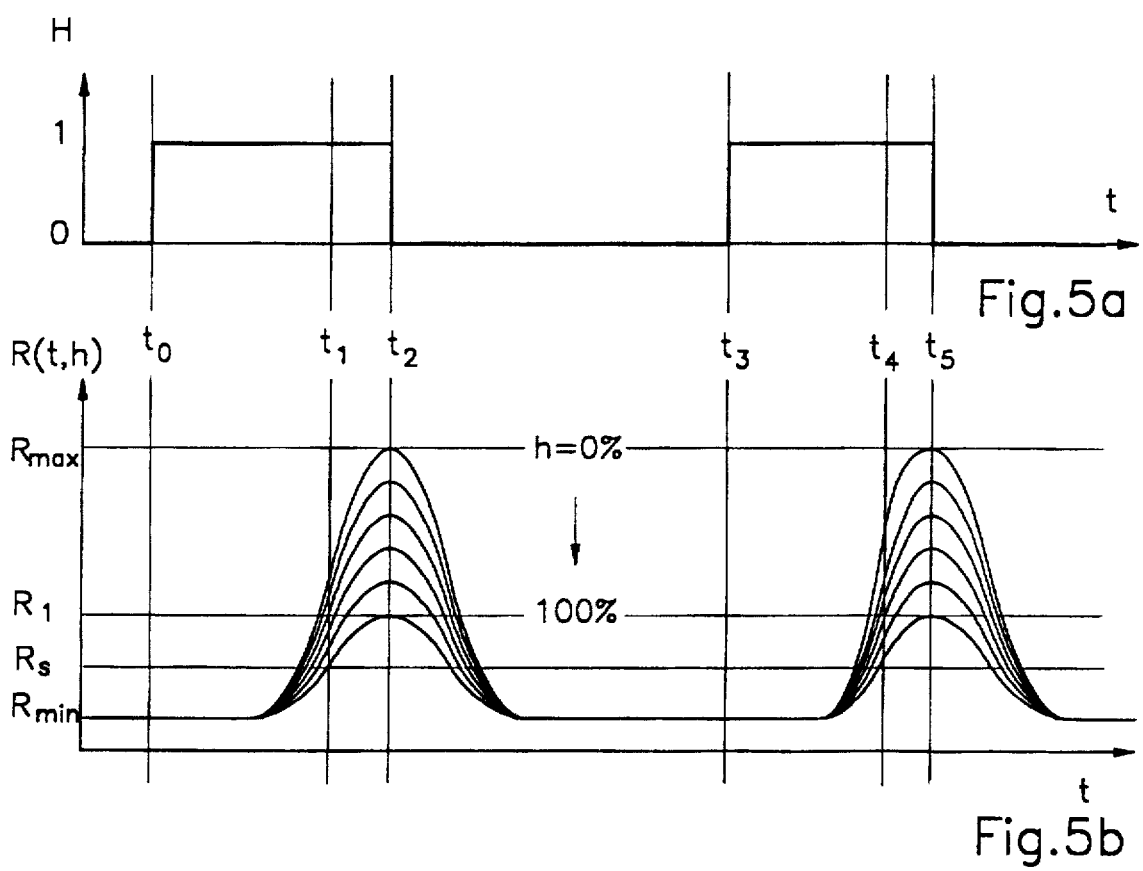

PROCESS AND SYSTEM FOR OPERATING A LEVEL SENSOR

FIELD AND BACKGROUND OF THE INVENTION

The present invention relates to a process and a system for operating a level sensor, particularly for measuring amounts of liquid in automotive vehicles, and employs a plurality of heatable thermistors a number of which, depending on the level of filling, are covered by the liquid and cooled by it to below the breakpoint temperature of the thermistors. As a result, the total resistance of the thermistors, possibly connected to further resistors, changes discontinuously as a function of the liquid level.

Such a level sensor has the advantage that no mechanically moved parts, such as float, lever and potentiometer wiper, are necessary, so that there is no wear and the dependability is improved.

The components of a motor vehicle, and thus also level sensors, must operate dependably in a wide range of ambient temperatures of ordinarily −40° C. to at least +70° C. In order to make certain that in cold weather at least the breakpoint temperature $T_0$ of the thermistors is reached and, in the case of high ambient temperatures, the temperature produced by the heating does not become so great that the liquid in the region of the heater boils, a control or regulating of the heating current is necessary.

SUMMARY OF THE INVENTION

It is an object of the present invention to provide a process for operating a level sensor of the above-indicated type in which adaptation to changing ambient temperatures is effected at little expense and with great reliability.

According to the invention, at least one thermistor is located above the maximum possible liquid level, and the temperature of the thermistors is increased to such an extent by a feeding of electric heating power that all thermistors which are above the existing liquid level have exceeded their breakpoint temperatures. Thereupon, the total resistance is measured.

It is preferable in this connection that the exceeding of the breakpoint temperature be established by a predetermined change in the total resistance.

By the process of the invention, assurance is had within the entire operating temperature range, that the thermistors are only heated to the extent necessary for measuring the level. This avoids a heating of the fuel beyond the boiling point in the event of high ambient temperatures, such as, for instance, 70° C. Another advantage of the process of the invention is that there is required only a slight enlargement of an evaluation circuit which is arranged in a region of the instrument panel together with other electronic devices. No additional electronic parts in the region of the liquid sensor itself are required. Only slight enlargement of the evaluation circuit is required. With the use of microcomputers in modern instrument panels, the additional expense consists essentially of a change in or an addition to a program for the microprocessor.

A simple recognition of the fact that the thermistors which are located above the level have reached their breakpoint temperature is possible by providing that, after an increase of the heating temperature, disconnection is obtained upon a predetermined change in the total resistance.

The heating of the thermistors is produced by the electric power. In the case of temperature-independent heating resistors, the heating can also be controlled via the heating voltage or the heating current. As a result of the thermal inertia of the elements, the heating is furthermore possible via a control of the time of a constant electric power (voltage or current).

In the process of the invention, measurement of the total resistance in itself is always possible when all thermistors lying above the level have exceeded their breakpoint temperatures. Since this temperature may differ depending on manufacturing tolerances, and a sudden change in resistance can occur already upon the first switching of a thermistor, it is provided, in accordance with a further feature of the invention, that the temperature of the thermistors is increased further by a predetermined value after the predetermined change in the total resistance.

Instead of this measure, it can, however, also be provided that the thermistor which is located above the maximum possible liquid level have a higher breakpoint temperature than all other thermistors or be less heated than all other thermistors lying above the corresponding level.

For connecting an evaluation circuit to the level sensor, a common return line (ground) for the heating resistors and the thermistors is as a rule more favorable from the standpoint of cost. In order, in this connection, to avoid disturbance of a result of the measurement by a voltage drop caused by the heating current, it is therefore provided, in accordance with a further feature, that the total resistance be measured directly after a disconnecting or during a brief interruption of the heating current.

One advantageous embodiment of the process of the invention provides that, for the duration of the connection, the heating power have a value which is sufficient in order to reach the breakpoint temperature. In this way, a rapid heating of the thermistors is possible.

In another advantageous embodiment of the process of the invention, it is provided that the heating power increase gradually until all thermistors lying above the liquid level have reached the breakpoint temperatures. In this case, the current can be disconnected when the necessary value has been reached. There is then only a relatively short time available for measuring the total resistance, as in the first embodiment.

Should this time not be sufficient, or should multiple sampling of the total resistance be necessary, it may also be provided that the heating power be retained for a predetermined measurement time after the value necessary for the exceeding of the breakpoint temperature has been reached, in which case the sampling of the total resistance may be effected during a brief interruption of the heating current.

In order to reduce the loss power in a thermistor controlling the heating current, it can be provided that the increase of the heating power be obtained by increased pulse-duty factors of high-frequency rectangular pulses (pulse-width modulation).

A further development of the invention provides that the required heating power be converted into a temperature value. In this way, a measurement of the inside temperature of the tank which can be used for other purposes in possible without additional expense.

In order to recognize defects in circuitry of the level sensor, it can be provided in the process of the invention that the instantaneous value of the total resistance and/or of the heating current be fed to a diagnostic device in which the values are checked for plausibility as a function of the corresponding operating state.

A system for carrying out of process preferably provides that the heating resistors ($H_o$ to $H_{n-1}$) are connected by an electronic switch (13), preferably a transistor, to a source of voltage (12); that the thermistors ($P_o$ to $P_{n-1}$) which are possibly connected with other resistors ($R_1$ to $R_n$) are connected to a source of voltage (17); that a connection between the thermistors and the source of current (17) is connected to the input of an analog/digital converter (33) the output of which is connected to an input of a microcomputer (31); and that the microcomputer (31) control the variation with time of the heating and effect the measurement of the total resistance. For considerations of cost, the source of current can also be replaced by a load resistor and a constant voltage.

BRIEF DESCRIPTION OF THE DRAWINGS

With the above and other objects and advantages in view, the present invention will become more clearly understood in connection with the detailed description of preferred embodiments when considered with the accompanying drawings, of which:

FIG. 5 includes FIGS. 5a–5b which show the variation with time of the heating and of the total resistance in a process for the operating of the first embodiment;

DETAILED DESCRIPTION OF THE PREFERRED EMBODIMENTS

Figure 1:
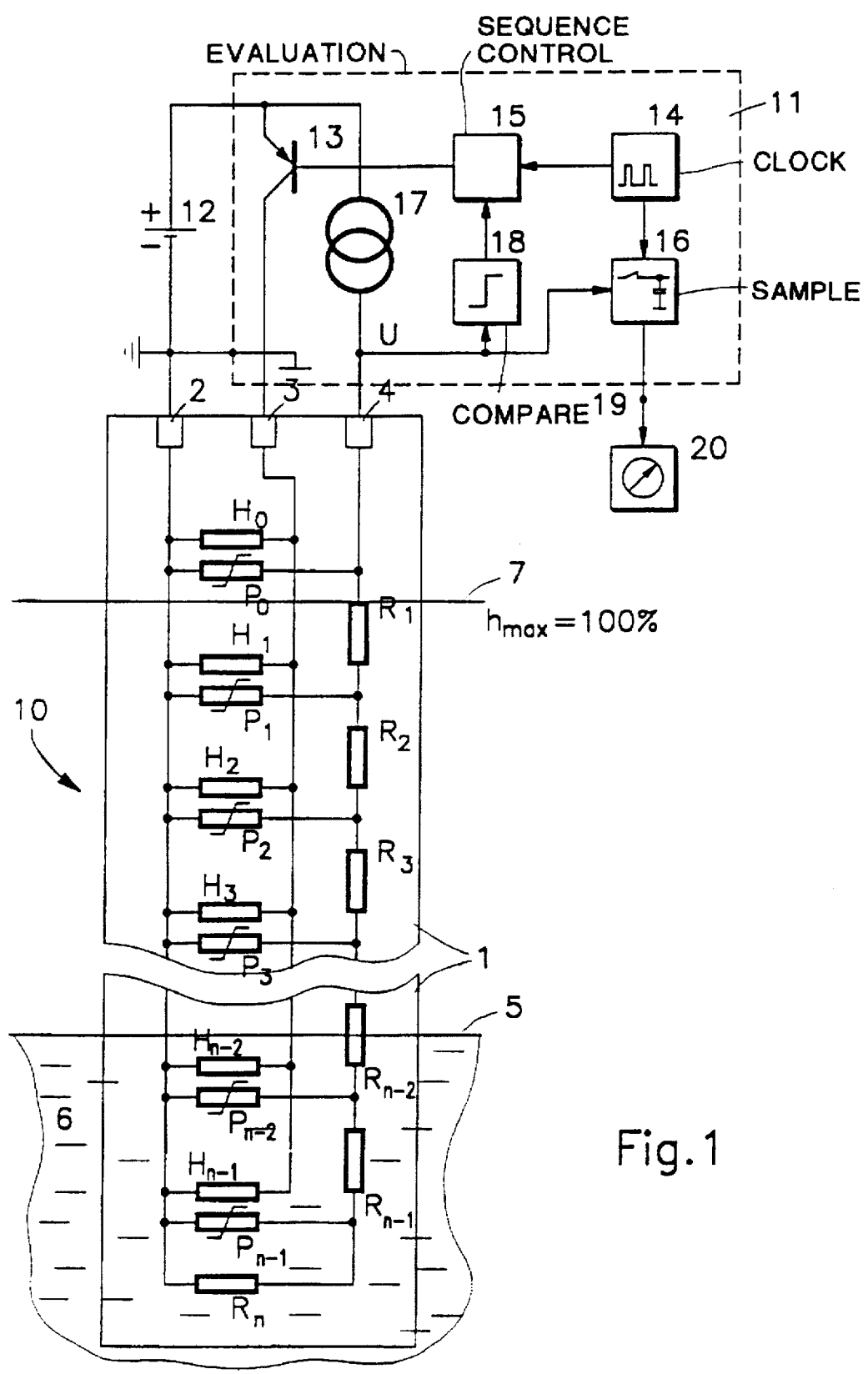
FIG. 1 is a diagrammatic showing of one embodiment.

In the figures, identical parts have been provided with the same reference numerals.

The arrangement shown in FIG. 1 consists of a level sensor 10 and an evaluation circuit 11. In the case of the level sensor, all parts are arranged on a strip-shaped circuit board 1 which is shown interrupted in the drawing. At the upper end, there are a terminal 2 for the common ground, a terminal 3 for the heating current, and a terminal 4 which serves as resistance output of the level sensor.

Figure 2:
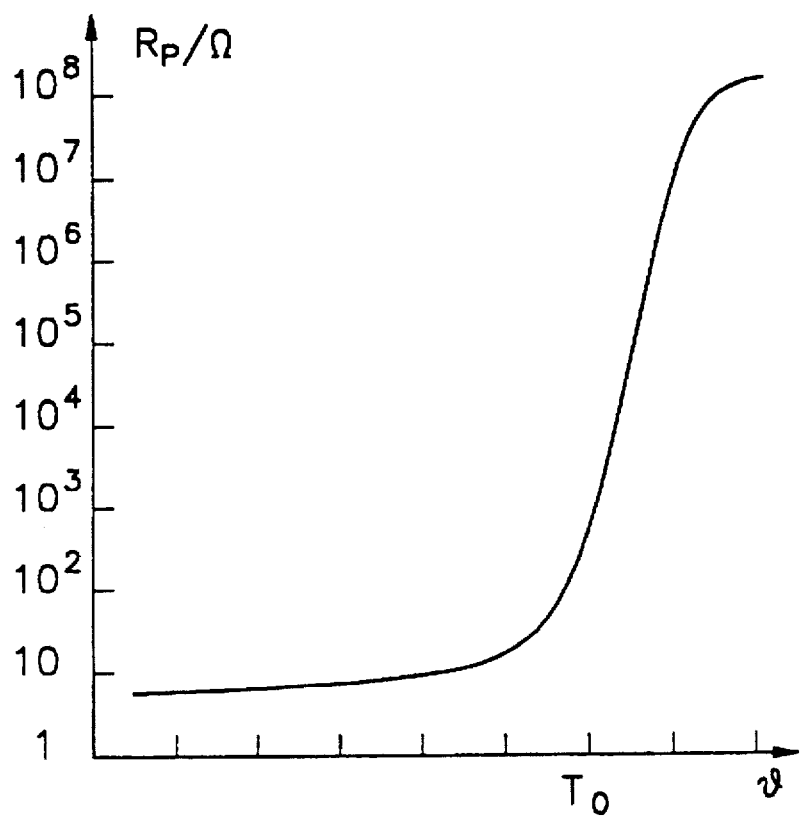
FIG. 2 is a resistance-temperature curve of a thermistor with positive temperature coefficient.

All fixed resistors $R_1$ to $R_n$ are connected in series between the terminals 4 and 2 and form a chain, each member consisting of one of the resistors $R_1$ to $R_{n-1}$ and one thermistor $P_1$ to $P_{n-1}$ each. The thermistors are also referred to in the following as PTC (positive temperature coefficient) elements in view of their positive temperature coefficient. An example of a resistance-temperature curve of a PTC element is given in FIG. 2. At a predetermined temperature $T_0$ (breakpoint temperature), the resistance increases relatively steeply from a low value of, for instance, 5Ω to values of more than 10 MΩ. If the resistors $R_1$ to $R_n$ are dimensioned between these orders of magnitude, for instance in the region between 1 KΩ and 100 KΩ, then the PTC elements act with respect to the behavior of the total resistance as a switch, i.e. the absolute values of the resistances at low and high temperatures have practically no effect on the total resistance and therefore do not falsify the result of the measurement.

Each of the PTC elements $P_1$ to $P_{n-1}$ is thermally coupled to a heating resistor $H_1$ to $H_{n-1}$. The PTC elements and the heating resistors can be developed so as to be electrically equivalent to each other. The thermal conduction between the heating resistor and the PTC element as well as to the environment is so adjusted by the heating power that above level 5, the PTC elements assume a higher temperature than $T_0$. One heating resistor $H_0$ and one thermistor $P_0$ are arranged above the maximum possible level 7.

Figure 3:
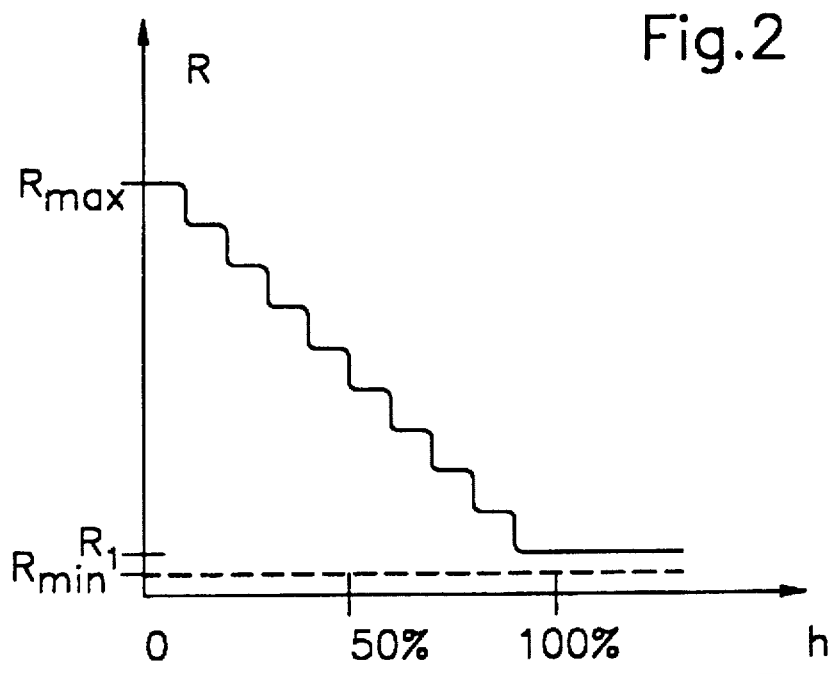
FIG. 3 is a characteristic curve of the total resistance as a function of the level.

All PTC elements below level 5 are cooled and are thus colder than $T_0$. It is a prerequisite that the maximum temperature of the liquid 6 be definitely less than $T_0$. The PTC element lying in each case directly below the liquid level thus connects the series connection of resistors above it to the ground terminal 2 with low resistance. The higher the level of the liquid rises, the fewer resistors therefore lie between terminals 2 and 4. The curve shown in FIG. 3 thus results. The total resistance $R_{max}$ is then $$R_{max} = \sum_{i=1}^{n} R_i.$$

The step-shaped curve applies for the heated level sensor. In disconnected state, the resistance of the thermistor $P_0$ assumes a low value which corresponds approximately to the minimum value of the total resistance $R_{min}$ and is shown in dashed line in FIG. 3.

The terminals 2, 3, 4 of the level sensor 10 are connected in each case by a wire to the evaluation circuit 11. The terminal 2 is furthermore connected to the vehicle ground and to the negative pole of a battery 12 which also provides the evaluation circuit 11 with voltage. Via a controllable switch, for instance a transistor 13, the terminal 3 of the level sensor 10 can be connected in pulsating manner with the positive pole of the battery 12.

In the control circuit 11 there is a clock generator 14 the clock pulses of which control a sample-and-hold circuit 16. Furthermore, the evaluation circuit 11 contains a constant current generator 17 which, via the terminal 4 of the level sensor 10, inserts a constant current in the sensor chain so that the voltage U on the terminal 4 is proportional to the total resistance at level 5. This voltage is fed to a comparator 18 which, when a predetermined threshold $R_r$ is exceeded (FIG. 5) gives off a signal to the sequence control 15. Furthermore, the voltage proportional to the total resistance is present at the input sample-and-hold circuit 16.

The parts 14, 15, 16 and 18 of the evaluation circuit 11 can be formed in known manner by circuits, the degree of integration depending in detail on the circumstances. These circuits can, however, also be produced by a microcomputer (not shown in FIG. 5, but described with reference to FIG. 9) having a suitable program. At the output of the sample-and-hold circuit 16, there is present a control signal which represents the level and can be fed via an output 19 to an indicating instrument 20.

If the system shown in FIG. 1 which has temperature-independent heating resistors is acted on for instance, by a variable voltage at the heating terminals 2 and 3, then the curves shown in FIG. 4 (with the use of PTC thermistors) appear for the total resistance between the terminals 4 and 2.

Figure 4A:
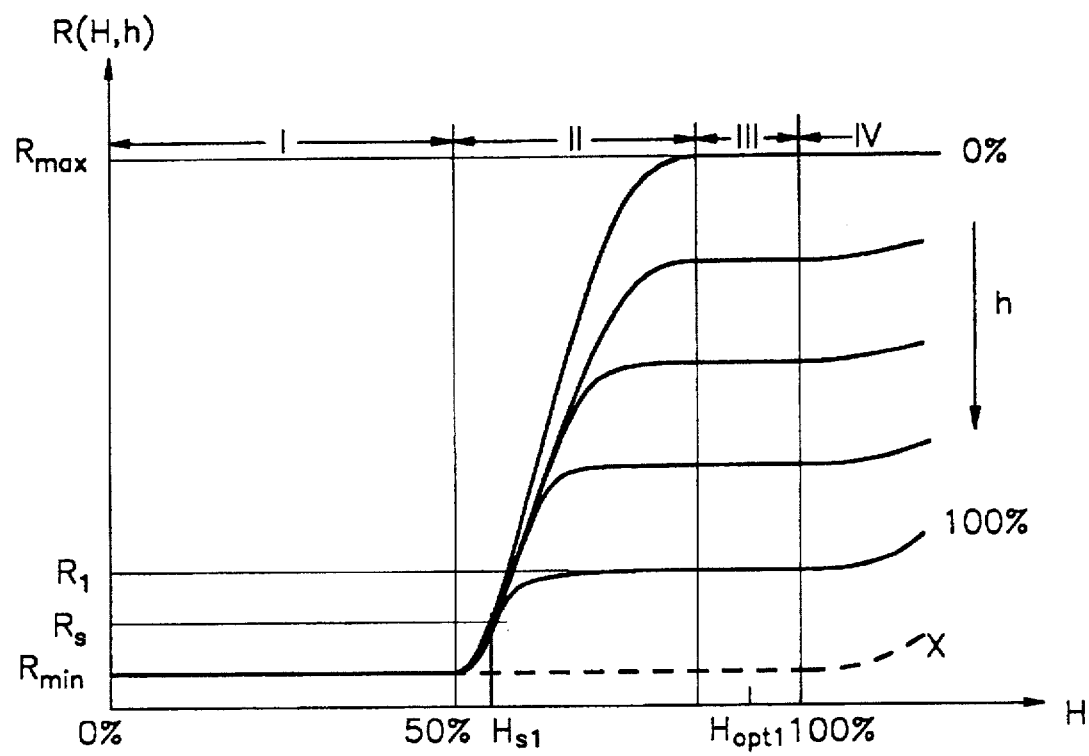
FIG. 4 includes FIGS. 4a–4b which are characteristic curves of the total resistance as a function of the heating voltage for different levels at two ambient temperatures.
Figure 4B:
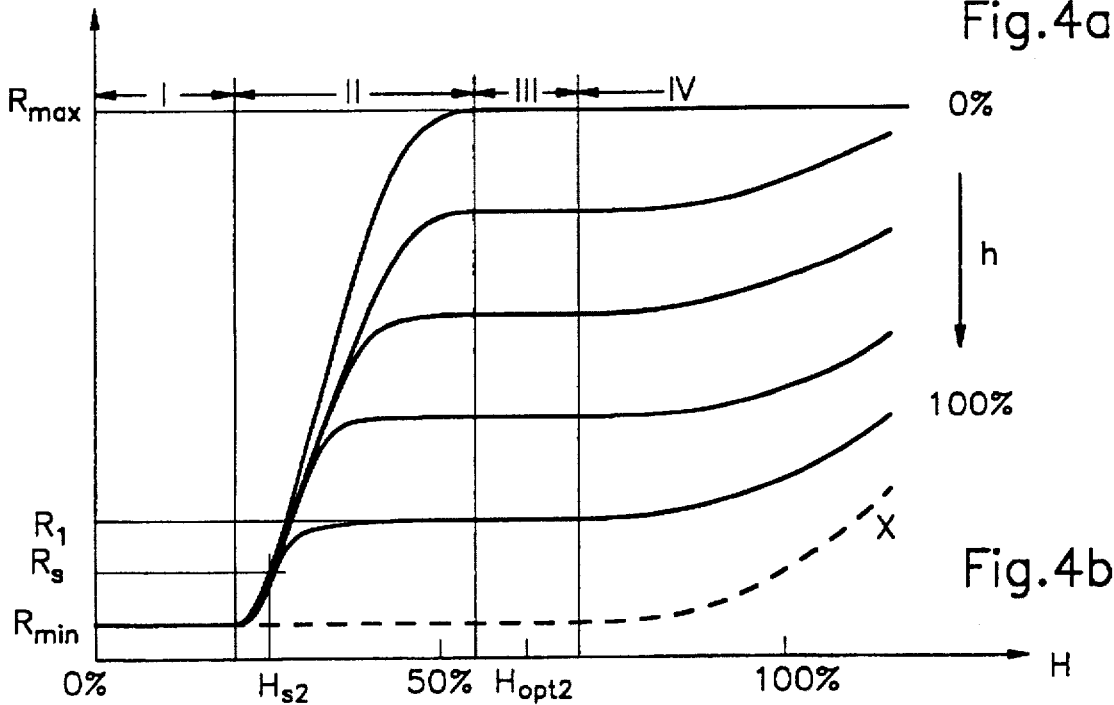

FIG. 4a shows the typical course in the case of a lower ambient temperature, and FIG. 4b in the case of a higher ambient temperature. If the heating power H is in the "cold" region I, then all PTC elements are far below the breakpoint temperature $T_0$, so that the total resistance has the value $R_{min}$. If the heating power is increased, the further course of the total resistance is determined as a function of the level h. In the stable operating region III, the level can be clearly determined via the total resistance. Upon further increase of the heating power, the PTC elements, which in themselves are cooled well in the liquid, slowly reach the breakpoint temperature by overheating. This over-control region IV, which is no longer unambiguous, must be avoided in the same way as the transition region II upon the measurement of the total resistance.

As measure for the determination of the optimal heating power $H_{opt}$ there is used the heating power $H_s$ at which the total resistance has reached the threshold value $R_s$. $R_s$ preferably lies in the middle between $R_{min}$ and $R_1$.

The dashed curve X would result if the element lying above the maximum level were impermissibly immersed and thus in this case no determination of $H_{opt}$ is possible.

The threshold value $H_s$ of the heating power and thus the optimal value $H_{opt}$ change with the ambient temperature. With high ambient temperatures (FIG. 4b) clearly less heating power is required than with low ambient temperatures (FIG. 4a).

This means that, from the threshold value $H_s$, it is possible directly to note the ambient temperature $T_U$ via the constant thermal resistance $R_{TH}$ of the elements and the breakpoint temperature $T_0$ of the PTC elements:

$$T_U = T_0 - P_{Hs} \cdot R_{TH},$$

in which $P_{Hs}$ is the heating power with the threshold value $H_s$.

Furthermore, the optimal operating heat power $H_{opt}$ is determined from the threshold value $H_s$, so that dependable operation is assured within the entire range of ambient temperatures for every level.

The function of the embodiment in accordance with FIG. 1 will be explained below on the basis of the time graph of FIG. 5. In this connection, FIG. 5a shows the course of the heating H, 0 meaning "off" and 1 meaning "on" FIG. 5b shows the variation of the total resistance R and of the voltage U proportional thereto. During the time before $t_0$, the system is at rest; i.e. no heating current flows since the transistor 13 is non-conductive. All thermistors have a small resistance so that the total resistance R has the minimum value $R_{min}$. At the time $t_0$, the heating is connected so that the heating resistors $H_0$ to $H_{n-1}$ and the thermistors $P_0$ to $P_{n-1}$ connected thereto warm up. In this connection the heating resistors and thermistors not covered by the liquid heat up substantially more.

As soon as a thermistor which is not covered by liquid has reached its breakpoint temperature, the voltage jump resulting therefrom is recognized by the comparator and reported to the sequence control 15. This is the case at the time $t_1$ in the showing of FIG. 5. The resistance has then exceeded the value $R_s$. In order to obtain a correct result of the measurement it is necessary, however, that the heating be continued until all thermistors lying above the liquid level have definitely exceeded their breakpoint temperatures. This can, of course, definitely be subject to differences caused by manufacturing tolerances. Therefore, the disconnecting of the heating by means of the sequence control 15 takes place only after a further period of time, namely at the time $t_2$.

FIG. 5b shows the variation with time of the total resistance R for different level values h; i.e. for, in each case, a different number of thermistors which lie below the instantaneous liquid level. In the case of the curve designated 0%, the tank is empty so that none of the thermistors is covered by liquid, while in the case of the curve designated 100%, only the thermistor $P_0$ and the heating resistor $H_0$ are not covered by liquid. During the heating, the total resistance R increases—starting from $R_{min}$—differently as a function of the liquid level. At the latest by the time $t_2$, the final value is reached since then all thermistors which are not covered with liquid are of high resistance. At this time, the switch contained in the sample-and-hold circuit 16 is closed for a short time so that the maximum value is stored until the next measurement.

Since in the embodiment shown in FIG. 1, the heating circuit and the measurement circuit have a common line, the voltage drop which is caused by the heating current may possibly falsify the measurement. Therefore, it is preferably provided that the measurement be effected directly after the disconnecting of the heating ($t_2$). The thermistors then again assume the ambient temperature so that the total resistance R again approaches the minimum value $R_{min}$.

At the time $t_3$, a further measurement is started, it being assumed that this measurement takes place at a higher ambient temperature. Therefore, the breakpoint temperature of the thermistors lying above the level of the liquid is reached faster ($t_4$).

The heating time ($t_1-t_0$) or ($t_4-t_3$) can also be evaluated for a measurement of the ambient temperature due to its dependence on the ambient temperature. This does not constitute any additional expense, especially in the case of the use of a microcomputer. Thus, with the arrangement in accordance with the invention, a temperature sensor which might possibly be necessary in the vehicle for other purposes—for instance in a system for monitoring the tank for leaks or the formation of gas—may be spared.

Figure 6A:
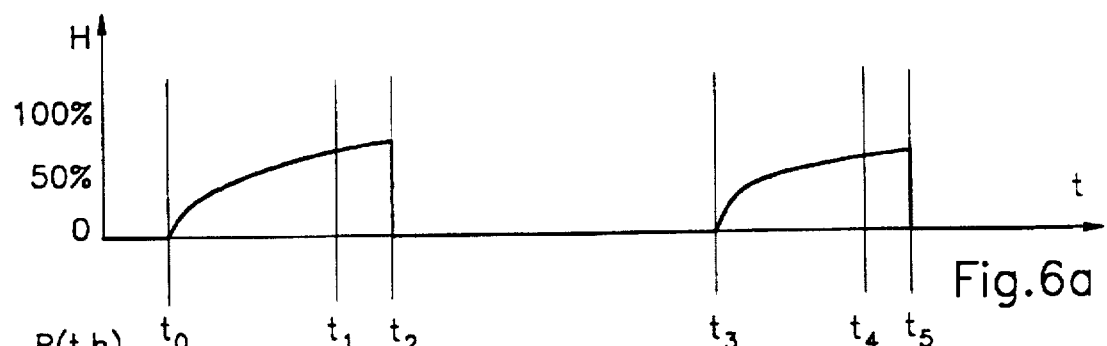
FIG. 6 includes FIGS. 6a–6c which show the variation with time of the heating and of the total resistance in another process for the operating of the first embodiment.
Figure 6B:
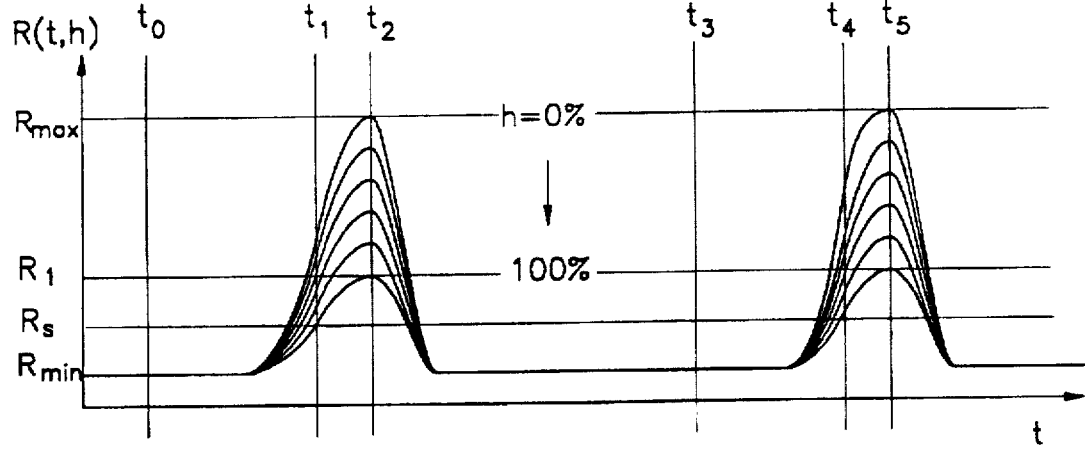
Figure 6C:
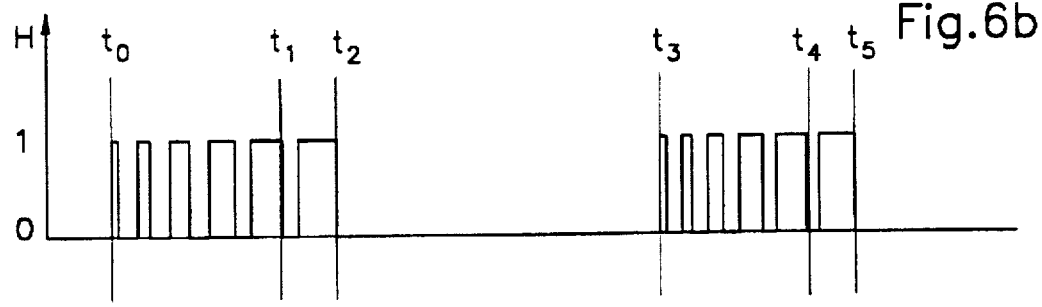

In the process shown in FIG. 6, the heating power, starting from the time $t_0$, is gradually increased by a suitably conducted control of the transistor 13 (FIG. 1). For this purpose, it can be provided, for instance, that the voltage rise in accordance with FIG. 6a in the form of a root function as a function of the time, such as being proportional to the square root of the heating time. The power and thus also the temperature then increase linearly with time. At the time $t_1$, the threshold $R_s$ is exceeded. After this, the heating power is further increased so that all thermistors lying above the liquid level definitely attain a high resistance. At the time $t_2$, the heating is then disconnected. Immediately thereafter, the voltage U which is proportional to the total resistance R is sampled and is stored until the next measurement. Otherwise, the total resistance behaves in the same way as in the process of FIG. 5, in which connection, due to the gradual increase of the heating power, but with a level sensor having the same static and dynamic temperature behavior, the rise takes place more slowly. For this case, FIG. 6 has a different time scale than FIG. 5.

With continuous control in accordance with FIG. 6a, a relatively large loss of power is converted in the transistor 13 (FIG. 1), which, aside from the increased current consumption of the evaluation circuit, also has the disadvantage that a more expensive power transistor and a more expensive cooling must be employed. This disadvantage can be avoided with a pulse-width-modulated control of the transistor in accordance with FIG. 6c. For the sake of clarity, the frequency of the pulse-width-modulated signal has been shown substantially smaller with reference to the heating time than advantageous in practice.

Figure 7A:
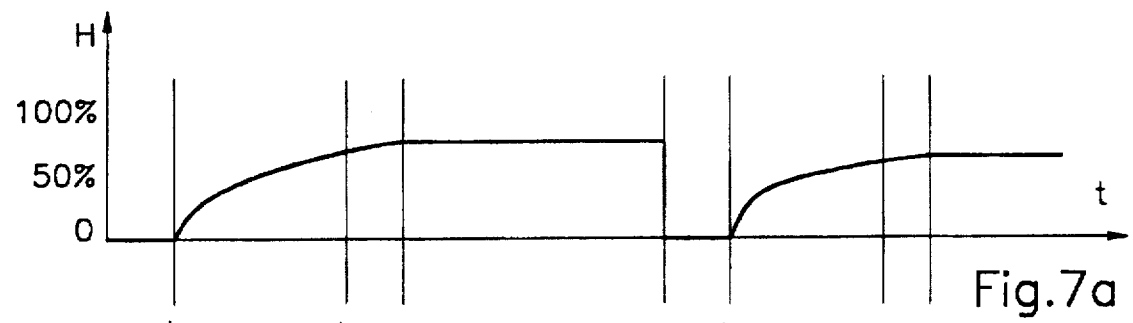
FIG. 7 includes FIGS. 7a–7c which show the variation with time of the heating and total resistance in the case of another process.
Figure 7B:
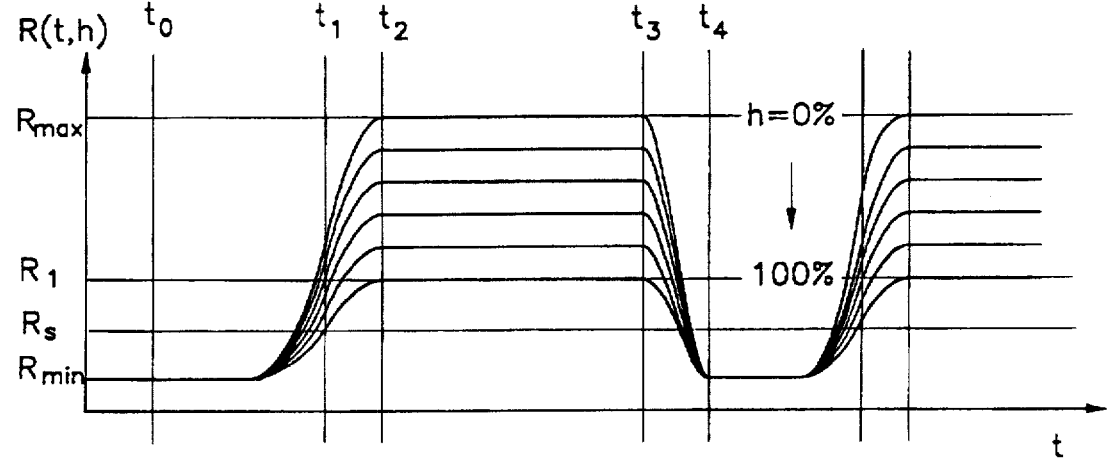
Figure 7C:
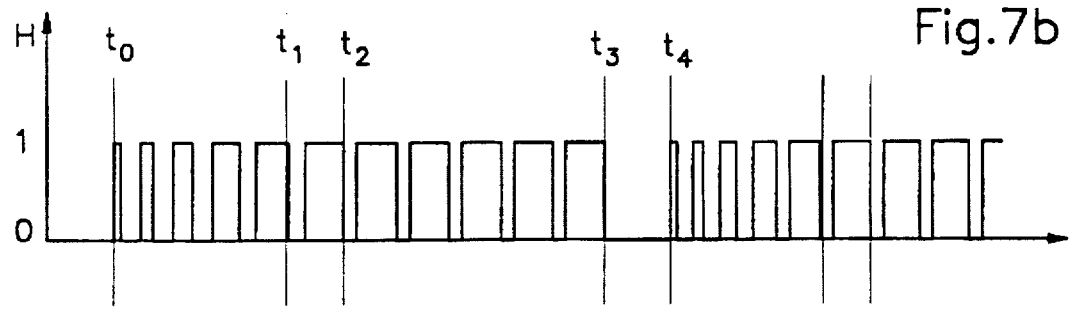

In the process shown in FIG. 7, the heating takes place in the same manner as in the process according to FIG. 6. After the heating power with which all thermistors above the liquid level have definitely attained high resistance, the heating, however, is not disconnected but is continued with the existing level of power until the time $t_3$. The time between $t_2$ and $t_3$, wherein there has been the maintaining of a constant heating power, can be selected to be rather long, and is limited only by the speed of the temperature change of the tank and the liquid. Between $t_3$ and $t_4$, sufficient time is to be provided for the cooling of the thermistors lying above the liquid level in order that the total resistance can again assume the value $R_{min}$ before the following heating.

Due to the aforementioned inertia of the change in temperature of the tank, substantially more time is available for measuring R and U than in the embodiments shown in FIGS. 5 and 6.

Figure 8:
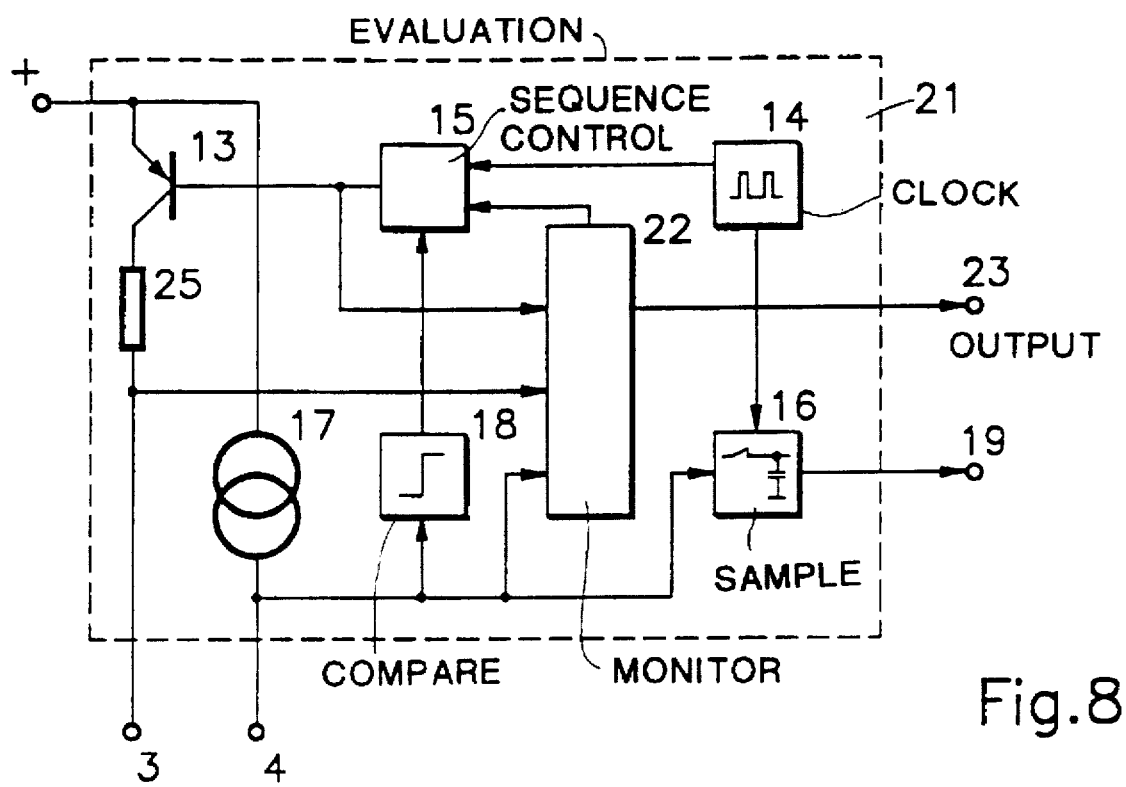
FIG. 8 shows another embodiment of an evaluation circuit.

In the embodiment of an evaluation circuit 21 in accordance with FIG. 8, aside from the elements already described in connection with FIG. 1, a monitoring circuit 22 is also provided. The output signal of the sequence control 15 is fed to the monitoring circuit, and the voltages described previously in FIG. 1 are fed to the terminals 3 and 4. By comparison of the voltages at the terminals 3 and 4 with predetermined threshold values, and by logical combinations with the output signal of the sequence control 15, defects can be recognized and error signals sent out over an output 23.

In order to monitor the heating currents through the terminal 3, a voltage drop on a current measurement resistor 25 is monitored. With the heating circuit connected, the total current consumption in the monitoring circuit 22 is checked. Any disturbance in the heating circuit including line breaks and short circuits is definitely recognized, whereupon an error signal is given off at the output 23. At the same time, the sequence control 15 can be instructed by the monitor 22 to interrupt the heating current for safety reasons. In similar manner, the voltage U at the terminal 4 can also be monitored.

Figure 9:
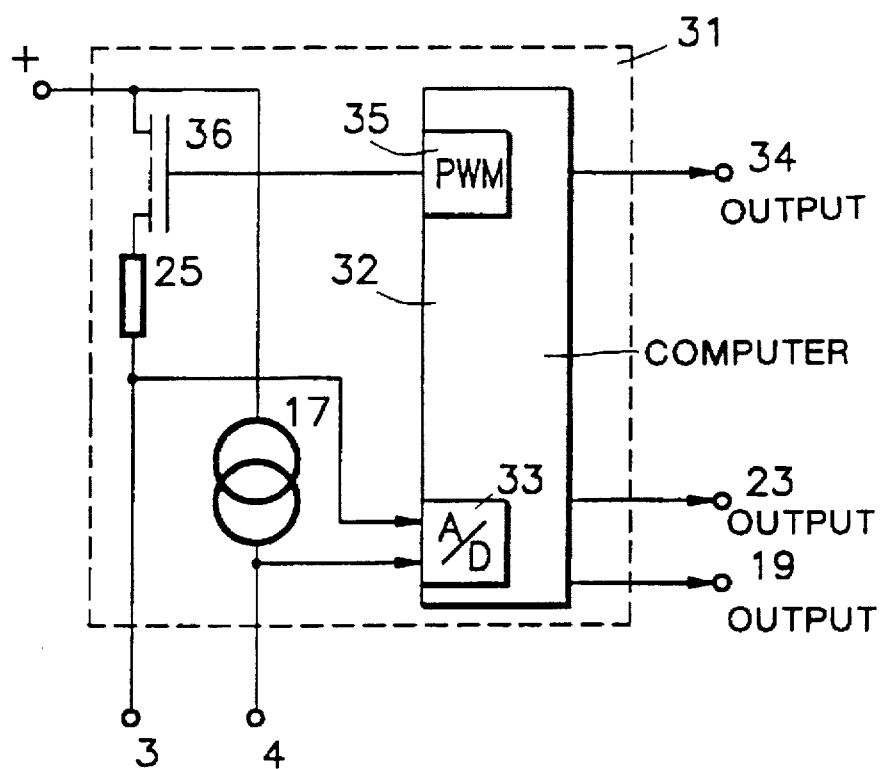
FIG. 9 shows an evaluation circuit having a microcomputer.

In the embodiment of an evaluation circuit 31 shown in FIG. 9, all parts aside from the transistor and source of current 17 are produced by means of a microcomputer 32. For this purpose, so-called single-chip microcomputers are suitable, such computers containing inter alia an analog/digital converter 33 to which different analog signals can be fed via a multiplexer (not shown), and a pulse width modulator 35. In the embodiment shown in FIG. 9, the voltages at the terminals 3 and 4 are fed to the microcomputer 32. An output of the microcomputer 32 is connected to the base of the transistor 36, which, in this embodiment, is developed as a field-effect transistor. The liquid level, error reports and the tank temperature can be obtained in the form of digital signals from further outputs 19, 23, 34 of the microcomputer 32.

I claim:

1. A method for operating a liquid level sensor, suitable for measuring amounts of liquid in automotive vehicles, the sensor having a plurality of thermistors and a plurality of heating resistors thermally coupled to the thermistors, wherein a number of the thermistors and the heating resistors, depending on a level of filling of a container with the liquid, are covered by the liquid, wherein the number of thermistors are cooled by the liquid to a temperature below a breakpoint temperature of each of the thermistors, the sensor further comprising a resistance circuit having a plurality of resistors of which individual ones of the resistors of the resistance circuit are connected to respective ones of the thermistors, wherein the total resistance of the thermistors, including resistors of the resistance circuit, changes discontinuously as a function of the liquid level, the method comprising steps of:

locating at least one thermistor of the plurality of thermistors above a maximum possible value of the liquid level;

positioning the plurality of heating resistors adjacent respective ones of said thermistors to enable thermal coupling between the heating resistors and the respective thermistors; and increasing the temperature of the thermistors by providing heating current to the heating resistors, wherein said heating resistors feed electric heating power to the thermistors to an amount wherein all of the thermistors present above the liquid level have exceeded their breakpoint temperatures, whereupon the total resistance of the thermistors and the resistance circuit is measured.

2. The method according to claim 1, wherein in said temperature increasing step, the exceeding of the breakpoint temperature in each of respective ones of the thermistors is established by a predetermined change in the total resistance of the thermistors and the resistance circuit.

3. The method according to claim 2, further comprising a step of raising the temperature of the thermistors further by a predetermined value of current after the predetermined change in the total resistance.

4. The method according to claim 1, further comprising a step of measuring the total resistance of the thermistors and the resistance circuit directly after a disconnecting or during a brief interruption of the heating current.

5. The method according to claim 1, wherein, in said step of providing the heating current, the heating current is provided as a pulse for the duration of an interval of time to the heating resistors, the pulse being terminated at an end of the interval, and the heating current is provided with a value during the interval which is sufficient in order to reach the breakpoint temperature of an individual one of said thermistors.

6. The method according to claim 5, wherein said step of providing heating current attains a required heating power by converting the current into heat at a desired temperature value.

7. The method according to claim 5, wherein, in said step of providing heating current, the heating power is increased gradually until all thermistors lying above the liquid level have reached their breakpoint temperatures.

8. The method according to claim 7, wherein said step of providing heating current is accomplished by a pulse width modulation of the heating current, such that an increase of the heating power is obtained by an increased pulse-duty factor of high-frequency rectangular pulses.

9. The method according to claim 7, further comprising a step of retaining the heating power, during said interval of the current pulse, for a predetermined measurement time after a value of power necessary for exceeding the breakpoint temperature of said individual one of said thermistors.

10. The method according to claim 9, wherein said step of providing heating current is accomplished by a pulse width modulation of the heating current, such that an increase of the heating power is obtained by an increased pulse-duty factor of high-frequency rectangular pulses.

11. The method according to claim 1, further comprising a step of feeding an instantaneous value of the total resistance of the thermistors and the resistance circuit to a diagnostic device in which values of voltage are checked for plausibility as a function of a corresponding operating state.

12. The method according to claim 1, further comprising a step of feeding an instantaneous value of the heating current to a diagnostic device in which values of voltage are checked for plausibility as a function of a corresponding operating state.

13. A method for operating a liquid lever sensor, suitable for measuring amounts of liquid in automotive vehicles, the sensor having a plurality of heatable thermistors wherein a number of the thermistors, depending on a level of filling of a container with the liquid, are covered by the liquid and cooled by it to a temperature below a breakpoint temperature of each of respective ones of the number of the thermistors, the sensor further comprising a resistance circuit having a plurality of resistors of which individual ones of the resistors of the resistance circuit are connected to respective ones of the thermistors, wherein the total resistance of the thermistors, including resistors of the resistance circuit changes discontinuously as a function of the liquid level, the method comprising steps of:

locating at least one thermistor of the plurality of thermistors above a maximum possible value of the liquid level;

increasing the temperature of the thermistors by feeding electric heating power to the thermistors to an amount wherein all of the thermistors present above the liquid level have exceeded their breakpoint temperatures, whereupon the total resistance of the thermistors and the resistance circuit is measured;

wherein in said temperature increasing step, the exceeding of the breakpoint temperature in each of respective ones of the thermistors is established by a predetermined change in the total resistance of the thermistors and the resistance circuit; and the method further comprises a step of selecting a higher breakpoint temperature for said at least one thermistor, which is located above the maximum possible liquid level, than for all of the other thermistors.

14. A method for operating a liquid lever sensor, suitable for measuring amounts of liquid in automotive vehicles, the sensor having a plurality of heatable thermistors wherein a number of the thermistors, depending on a level of filling of a container with the liquid, are covered by the liquid and cooled by it to a temperature below a breakpoint temperature of each of respective ones of the number of the thermistors, the sensor further comprising a resistance circuit having a plurality of resistors of which individual ones of resistors of the resistance circuit are connected to respective ones of the thermistors, wherein the total resistance of the thermistors, including resistors of the resistance circuit changes discontinuously as a function of the liquid level, the method comprising steps of:

locating at least one thermistor of the plurality of thermistors above a maximum possible value of the liquid level;

increasing the temperature of the thermistors by feeding electric heating power to the thermistors to an amount wherein all of the thermistors present above the liquid level have exceeded their breakpoint temperatures, whereupon the total resistance of the thermistors and the resistance circuit is measured;

wherein in said temperature increasing step, the exceeding of the breakpoint temperature in each of respective ones of the thermistors is established by a predetermined change in the total resistance of the thermistors and the resistance circuit; and the method further comprises a step of reducing the heating of said at least one thermistor, which is located above the maximum possible liquid level, than for another one of the thermistors lying above said maximum level.

15. A system including a liquid level sensor suitable for measuring amounts of liquid in automotive vehicles, the sensor having a plurality of thermistors wherein a number of the thermistors, depending on a level of filling of a container with the liquid, are covered by the liquid and cooled by it to a temperature below a breakpoint temperature of each of respective ones of the number of the thermistors, the sensor further comprising a resistance circuit having a plurality of resistors of which individual ones of the resistors of the resistance circuit are connected to respective ones of the thermistors, wherein the total resistance of the thermistors, including resistors of the resistance circuit, changes discontinuously as a function of the liquid level;

wherein in the system, at least one of the thermistors is located above a maximum possible value of the liquid level;

wherein the system includes means for increasing the temperature of the thermistors by feeding electric heating power to the thermistors to an amount wherein all of the thermistors present above the liquid level have exceeded their breakpoint temperatures, whereupon the total resistance of the thermistors and the resistance circuit is measured based on an amount of the electric heating power;

the system comprises an electronic switch, a source of current, an analog/digital converter, and a computer;

a plurality of heating resistors, thermally coupled to said thermistors, and connected by said electronic switch to said source of current;

wherein said plurality of thermistors are connected to said source of current;

a junction between said thermistors and said source of current is connected to an input of said analog/digital converter, an output of said converter being connected to an input of said computer; and said computer includes means for controlling a variation with time of a heating of said heating resistors and effects a measurement of the total resistance of the thermistors and the resistance circuit.

16. A system according to claim 15, wherein said switch comprises a transistor.

17. A system according to claim 15, further comprising a network of resistors interconnecting said thermistors with said source of current.

18. A system according to claim 15, wherein said junction comprises a load resistor interconnecting said thermistors with said source of current, and wherein a circuit node between said load resistor and said thermistors is connected to said computer.

* * * * *